United States Patent [19]

Wasserbaech et al.

[11] Patent Number: 5,630,269
[45] Date of Patent: May 20, 1997

[54] METHOD FOR FIXTURING ABUTTED SHEET METAL PARTS FOR WELDING

[75] Inventors: Eberhard E. Wasserbaech, Shelby Township; Mark M. Eisenmenger, Canton, both of Mich.

[73] Assignee: General Motors Corporation, Detroit, Mich.

[21] Appl. No.: 491,662

[22] Filed: Jun. 19, 1995

[51] Int. Cl.⁶ .................................................. B23P 17/00
[52] U.S. Cl. ........................... 29/559; 29/281.5; 228/44.3; 228/49.4; 228/212
[58] Field of Search ........................... 269/305, 235; 228/44.3, 49.4, 212; 29/281.4, 281.1, 281.5, 559; 266/56, 112; 219/102, 121.13, 61.13, 121.45, 121.63

[56] References Cited

U.S. PATENT DOCUMENTS

| | | |
|---|---|---|
| 3,423,502 | 1/1969 | Stimpson ............................. 29/559 |
| 3,785,030 | 1/1974 | Une et al. ........................... 29/281.1 |
| 3,788,634 | 1/1974 | Chauvet et al. ................... 228/44.3 X |
| 4,621,797 | 11/1986 | Ziegenfuss ....................... 269/305 X |
| 5,276,304 | 1/1994 | Sauvage et al. .................. 228/49.4 X |
| 5,536,915 | 7/1996 | Peru et al. ........................ 228/49.4 |

Primary Examiner—S. Thomas Hughes
Assistant Examiner—Tisa L. Stewart
Attorney, Agent, or Firm—Patrick M. Griffin

[57] ABSTRACT

A method and apparatus for positioning and holding a pair of sheet metal blanks to be butt welded into a compound blank for stamping a larger panel with varying thicknesses. A fixture plate is provided with locating corners matching predetermined reference corners of the blank and with mechanisms for pushing the blanks into the locating corners. The first blank is pushed into abutment with stops that are then pivoted out of the way, after the first blank is clamped in place. The second blank is then abutted with the already clamped first blank, and clamped. The loaded fixture is then transported to a weld station, where the pre positioned blanks can be quickly and efficiently laser welded.

1 Claim, 4 Drawing Sheets

METHOD FOR FIXTURING ABUTTED SHEET METAL PARTS FOR WELDING

This invention relates to methods of part fixturing in general, and specifically to a method and apparatus for quickly and efficiently fixturing sheet metal blanks to be welded together along abutted straight edges thereof.

BACKGROUND OF THE INVENTION

Sheet metal body stampings for automobile bodies are becoming larger, encompassing more and different areas of the vehicle body into a unitary panel. This reduces part count and increases quality and assembly productivity, but often requires that the blank to be stamped into the large body panel be comprised of two or more smaller subblanks of differing thicknesses. Greater thicknesses may be needed only in certain areas, and to make the entire panel that thick would represent a great cost and weight penalty. Typically, such a compound blank uses two sheet metal blanks laser welded together at abutted straight edges. The welding operation requires that the blanks be solidly fixtured and held together at the abutted edges.

FIG. 1 shows a typical apparatus used today to weld compound blanks. The fixturing and welding operations are combined in the same apparatus, which, while it sounds efficient, is actually not as efficient as it should be. The two blanks have to be pushed toward one another, into the apparatus, in order to bring the straight edges into abutment, between upper and lower edge clamps. The weld beam then runs along the abutted edge interface, assuming that the interface has been properly located. Proper blank and edge location is heavily dependent upon the blanks having been cut or sheared very close to their nominal size initially. Those skilled in the art will recognize that there is an inevitable variation in blank size, and in the angle subtended by the corners thereof, because of normal manufacturing tolerances. Moreover, the various positioning operations, manual or otherwise, that must be applied to the blanks to properly locate them, with the known apparatus, must be applied remote from the abutted edge interface, and that interface is not easily visible. All the positioning and clamping must be completed before the welding can be accomplished, which represents a process bottleneck that limits how quickly a complete cycle can be located.

SUMMARY OF THE INVENTION

The invention provides an improved method and apparatus for fixturing the blanks, which in mm allows a more efficient and rapid welding process. The new fixture allows the two blanks to be fixtured at a location remote from the welding apparatus, not directly in it, as described above. It quickly and accurately locates and clamps the two blanks, which are then loaded along with the fixture into a simple welding apparatus, unobstructed by integral clamps. By decoupling the fixturing and welding operations, multiple welders and multiple fixtures can be used, as well, with one fixture always being loaded as a previously loaded fixture is running through the welder. This allows optimal utilization of available blank shearing and laser welding capacity.

In the preferred embodiment disclosed, two sheet steel blanks are to be fixtured with two straight edges thereof in abutment. Each straight edge is adjacent to a blank reference corner of predetermined nominal angle. The fixture comprises a solid, heavy foundation plate, large enough to accommodate both sheet metal blanks when abutted, and which can be separately shifted into or out of the welder.

Fixed to the plate is a pair of locating stops, each with a planar stop surface normal to the plate, which together establish an imaginary line corresponding to the desired location of the weld interface between the blanks. In the embodiment disclosed, the locating stops are capable of being pivoted up or down to move them into operative position, then clear of the edge interface. Offset to both sides of the locating stops is a cylindrical roller. The outer surface of each cylindrical roller is tangent to an imaginary line which, where it intersects the desired weld line, matches the nominal angle of the reference corner of a respective blank. Thus, each cylindrical roller acts as another stop which, in conjunction with the planar stops, creates a locating corner on the plate that is matched to the ideal shape of the blank's reference corner. Diagonally opposed to each locating corner is a pair of movable pusher rollers which, in an off position, sit outside the perimeter of the blank. When energized, the rollers move diagonally toward the respective locating corners of the fixture, engaging a respective opposed blank corner and pushing the blanks' reference corners into position.

In the sequence disclosed, the locating stops are moved to their operative position, and the sheet metal blanks are dropped onto the fixture in a rough, initial location, anywhere between their respective fixture locating corners and pairs of pushing rollers. Then, a first blank is pushed snugly into its locating corner by its pusher rollers, into abutment against both the planar locating stops and its respective cylindrical stop. The first blank moves into complete abutment with the planar stops regardless of tolerance variations in the blank's reference corner, because the cylindrical stop makes only tangential contact with the reference corner's edge. Then, the first blank is clamped down, by electromagnets beneath the blank, in the embodiment disclosed. Next, the locating stops can be swung out of the way, because the clamped down edge of the first blank now establishes and retains the desired weld line. The procedure is repeated with the second blank, which is moved snugly into its respective locating corner, but into abutment with the edge of the first blank, not the planar stops, and then clamped in place. The fixture and clamped blanks may now be moved into the welder, and another fixture can be loaded, if desired.

BRIEF DESCRIPTION OF THE DRAWINGS

These and other features of the invention will appear from the following written description, and from the drawings, in which.

DESCRIPTION OF THE PREFERRED EMBODIMENT

Figure 4:
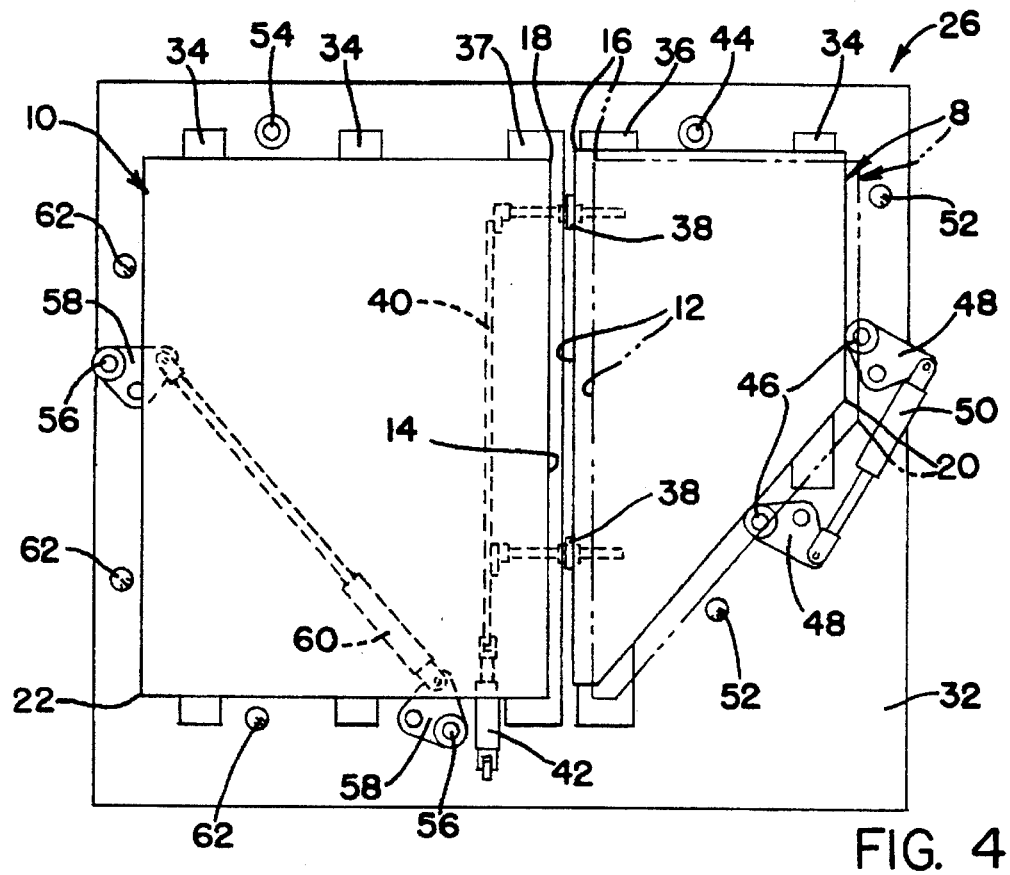
FIG. 4 shows the first blank pushed into position and clamped down.

Referring first to FIG. 4, a pair of sheet metal blanks, a first blank indicated generally at 8 and second blank 10, are sheet steel pieces of a generally polygonal shape, but differing thickness. Here, first blank 8 is the thicker of the two. Each has a respective straight edge 12 and 14, which is adjacent to a corner 16 and 18, respectively, which can be termed a reference corner. Because of inevitable manufacturing tolerances, the angles subtended by the reference corners 16 and 18 may vary from the ideal or nominal size, within a small range, but the method of the invention can still locate the edges 12 mad 14 in proper orientation regardless, as will appear below. Diagonally opposed to each reference corner 16 and 18 is a respective outer corner 20 and 22. Blanks of other shape may not have an outer corner per se that is diagonally opposed to the reference corners, but will generally have at least some outer edge or other surface in a comparable location. The blank fixturing method and apparatus of the invention works in conjunction with these various corners and edges of the blanks 8 and 10 to provide proper, automatic and repeatable blank orientation for the welding operation.

Figure 2:
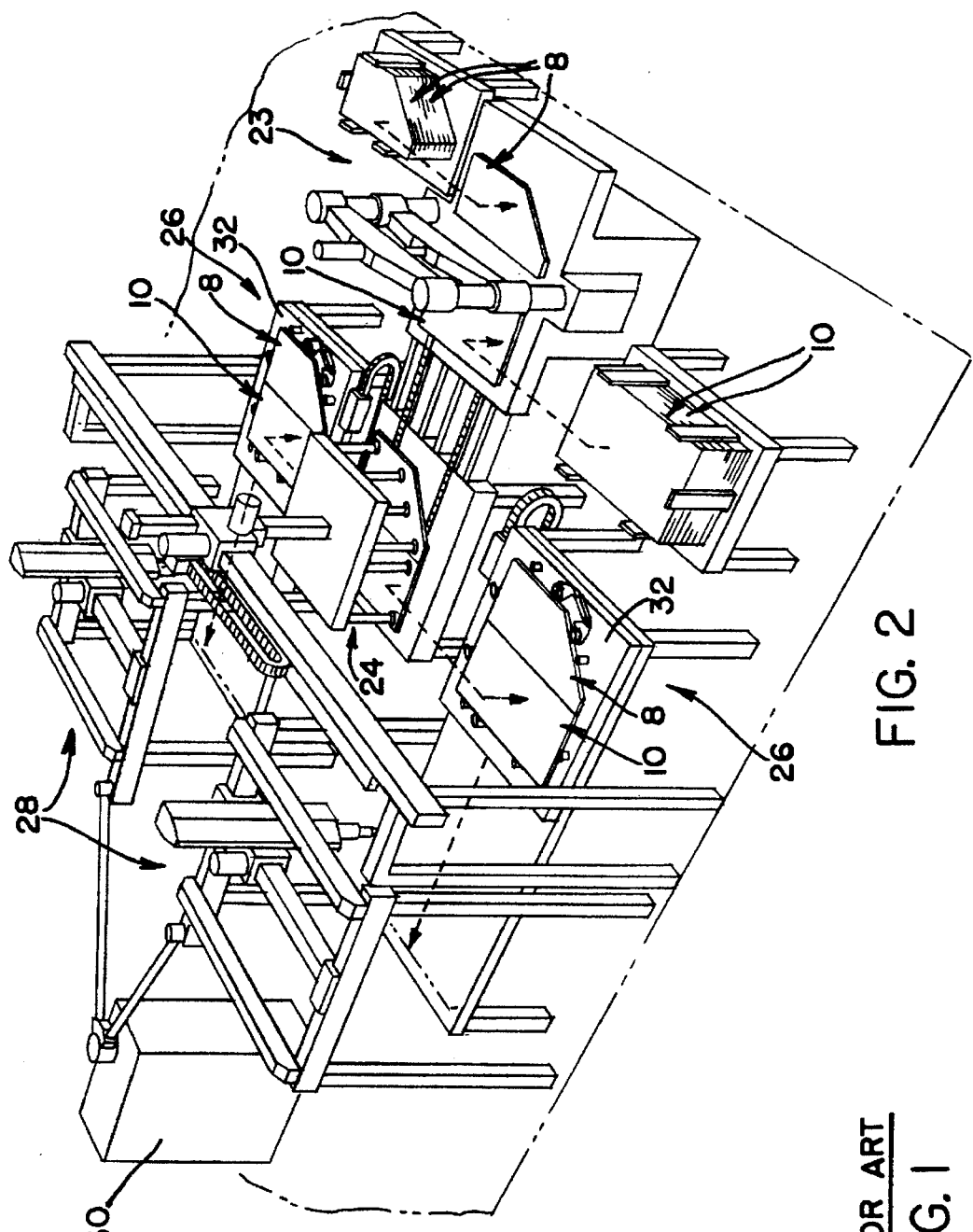
FIG. 2 is a perspective view of an entire assembly and welding layout incorporating the fixturing method and apparatus of the invention.
Figure 1:
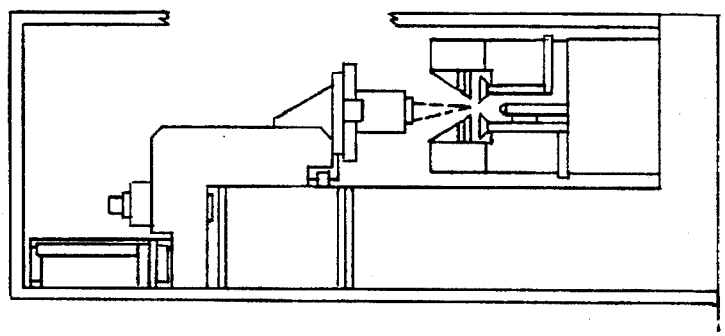
FIG. 1 is a view of the prior art welding and clamping apparatus described above.

Referring next to FIG. 2, a complete manufacturing layout allowing for optimal utilization of available shearing and welding capacity is shown. Individual layers from piles of the two sheet metal blanks 8 and 10 in rough cut form are moved in pairs to the table of a precision shearing station 23, where they are final sized. Even so, either or both blanks may have slight variations in shape, reflected in straight edge lengths and in the angles of the various corners formed thereby. From the shearing station 23, a blank pickup shuttle 24 grabs a pair of blanks 8 and 10 and moves them, in the embodiment disclosed, to one of two identical fixtures, indicated generally at 26. Here, the blanks 8 and 10 are abutted and clamped into a weld ready position, details of which process are described below. Then, the loaded fixtures 26 are shifted into the adjacent one of two side by side laser welding stations 28, each of which is served by a single power generator 30. Each welding station 28 is very simple in design, being basically a table and open overhead frame unencumbered by integral clamps or other mechanisms. Thus, a loaded fixture 26 can be simply slid into place and the blanks 8 and 10 welded together, very quickly. If the fixture 26 can be loaded quickly and efficiently, as well, then the sum total of the two separate operations, will be no longer, and conceivably shorter than, the conventional combined positioning and welding operation described above. This efficient serial fixturing and welding, especially in combination with the use of multiple fixtures and welders, allows for more efficient use of the available capacity of a single shearing station 23 and single weld generator 30. Details of the fixture and its operation are described next.

Figure 3:
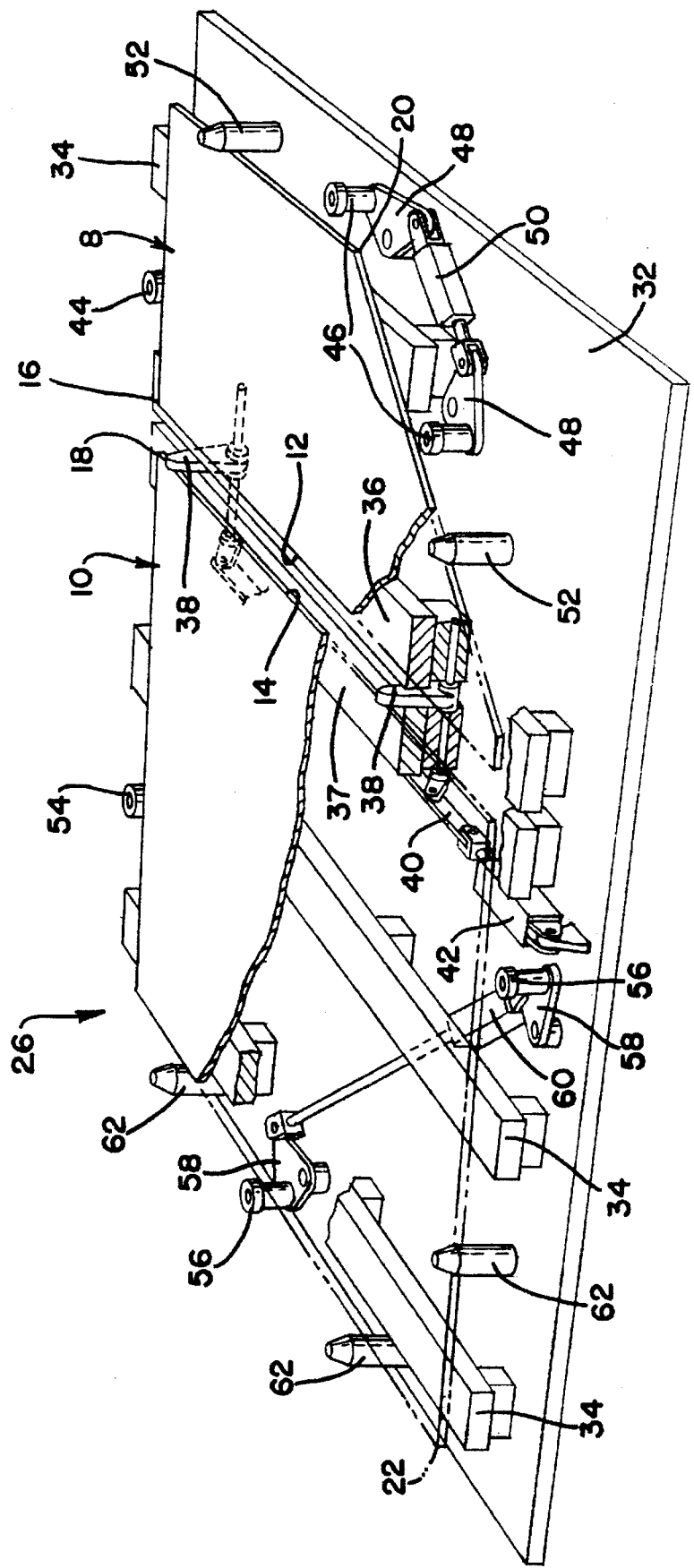
FIG. 3 shows a perspective of the fixture with the two blanks dropped into a rough, initial location.

Referring next to FIG. 3, the first steps in the method of the invention are the manufacture of the fixture 26, the structural details of which are illustrated. A heavy, generally planar plate 32 provides the foundation or base, relative to which other components are located, and which itself is later located in a fixed position on the welding stations 28. Plate 32 is sufficiently large to allow both blanks 8 and 10 to rest thereon with substantial area left around the perimeter. The upper surfaces of a plurality of cross rails 34 provide a planar support for the blanks 8 and 10, elevating them above the plate 32, and above some other fixture components. Two adjacent electromagnetic clamps 36 and 37 are located parallel to either side of the desired weld line. The upper surfaces of the clamps 36 and 37 lie on the same plane as the cross rails 34, and rigidly hold down the blanks 8 and 10, which are ferrous, once they are in final position. A pair of pivotable locating stops 38 are attached to an elongated rod 40 that runs beneath the upper surfaces of the cross rails 34, and can be selectively swung up or down above or below that plane by a pneumatic actuator 42. The flat surfaces of the locating stops 38 face to the right, from the perspective of FIG. 3 comprise, perpendicular to the upper surfaces of the cross rails 34. The stops 38 thereby create, together with the adjacent electromagnetic clamp 36, a ledge perpendicular to the plate 32. The ledge so formed establishes an imaginary straight line that will ultimately serve as the weld line between the blank edges 12 and 14. A cylindrical locating roller 44 is set on an axis normal to the plate 32, to the right of the locating stops 38. Roller 44 has an outer surface that is tangent to an imaginary line which, in turn, by intersection with the imaginary weld line, establishes a locating corner that matches the nominal, ideal angle of the first blank reference corner 16. A pair of pusher rollers 46 are pivoted to plate 32 by a pair of bell cranks 48 which can be pulled together or pushed apart by a selectively retractable and extendable pneumatic actuator 50. A pair of positioning cones 52 extend upwardly from plate 32, above the plane of the cross rails 34, and reside at points located well outboard of where the outer edges of the first blank 8 reside in its clamped, final position. Likewise, when the actuator 50 is retracted, the pusher rollers 46 sit outboard of the final location of the first blank outer corner 20. More detail on the location of these components is given below. The cones 52 and rollers 46 cooperate to orient and position first blank 8 automatically, as described in detail below.

Still referring to FIG. 3, the other side of the fixture 26 has essentially identical components, which correspond in mirror image to those that serve the first blank 8, but matched instead to the size of the second blank 10. The cross rails 34 provide the same blank support, and the clamp 37 also provides a ledge that lies on the weld line. In this case, however, that ledge is created not in conjunction with the locating stops 38, but in cooperation with the already located straight edge 12 of the first blank 8, as will appear below. A similar cylindrical locating roller 54 has an outer surface that is tangent to an imaginary line that intersects the weld line and thereby establishes a locating corner for the second blank 10, which matches its nominally sized reference corner 18. A pair of pusher rollers 56 are similarly positioned relative to the second blank outer corner 22, pivoted to plate 32 by a pair of bell cranks 58 which can be pulled together or pushed apart by a pneumatic actuator 60. Three positioning cones 62 bear the same spatial relationship to the second blank 10 as do the cones 52 to the first blank 8. Once the fixture 26 has been constructed with the illustrated components having the described spatial relationship to the particular shape blanks 8 and 10, they are used to position and clamp the blanks as described next.

Referring next to FIGS. 2 and 4, a pair of sheared blanks 8 and 10 are picked up from the shearing station 23 by the shuttle 24 and moved to one side or the other, onto whichever one of the two identical fixtures 26 happens to be empty. The planar locating stops 38 are pivoted upwardly to an operative position at this point. The shuttle 24 then drops the blanks 8 and 10 onto the cross rails 34, with enough accuracy, in general, to locate each blank 8 and 10 near its respective fixture locating corner. Specifically, each blank 8 and 10 is dropped between its respective positioning cones 52, 62, respective pusher rollers 46, 56, and the locating stops 38. Should either of the blanks 8 or 10 hit the positioning cones 52 or 62, they act to funnel them down onto the rails 34 and into their rough, initial position. The initial drop position of the first blank 8 is shown in dotted lines in FIG. 4 and is shown in solid lines for second blank 10. Then, the pneumatic actuator 50 is extended to swing the bell cranks 48 and engage the pusher rollers 46 to either side of the first blank outer corner 20. This creates an effective diagonal force directed toward the locating corner of the fixture 26. The rollers 46, given the way they are pivoted to the plate 32 and mutually swung by the single actuator 50, can rock back and forth and compensate for any variations in the opposed outer corner 20, either variations in its angle, or in the location in which it is initially dropped. The first blank 8 moves ultimately from the dotted line to the solid line position of FIG. 4, bringing straight edge 12 into abutment with the locating stops 38, and bringing the other edge of the reference corner 16 against the outer surface of the cylindrical locating roller 44. The electromagnetic clamp 36 is then energized to hold the first blank's straight edge 12 rigidly down, and the locating stops 38 are swung down and out of the way, clear of the edge 12.

Figure 7:
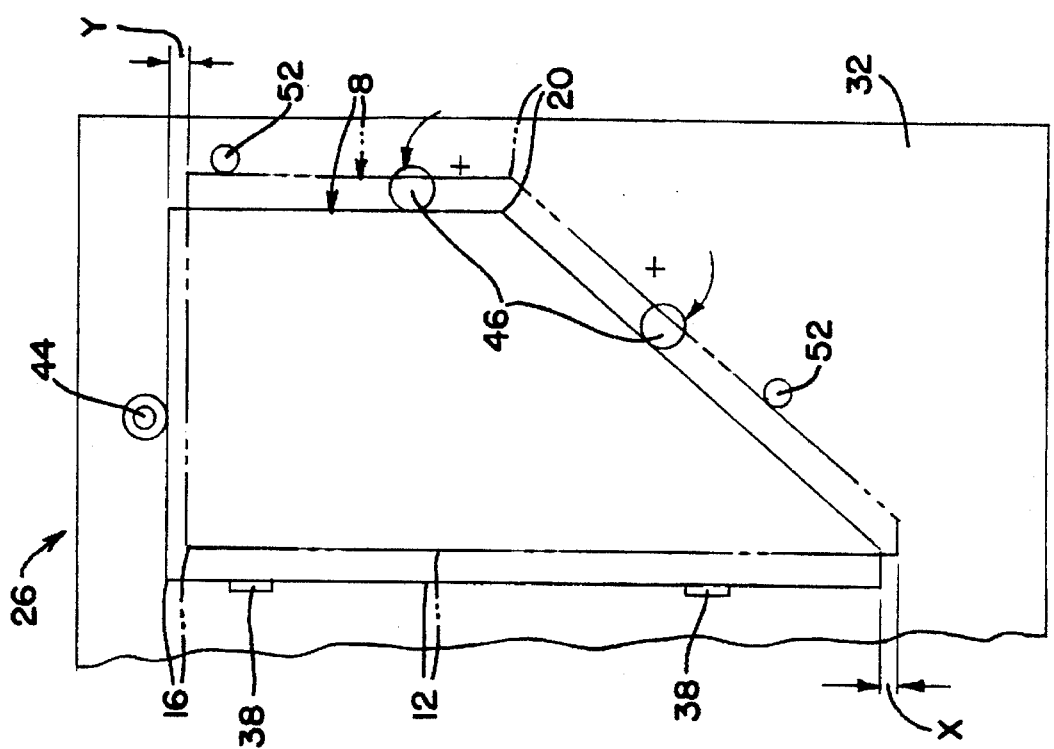
FIG. 7 is a schematic view showing the motion of the first blank from its initial to final location.
Figure 6:
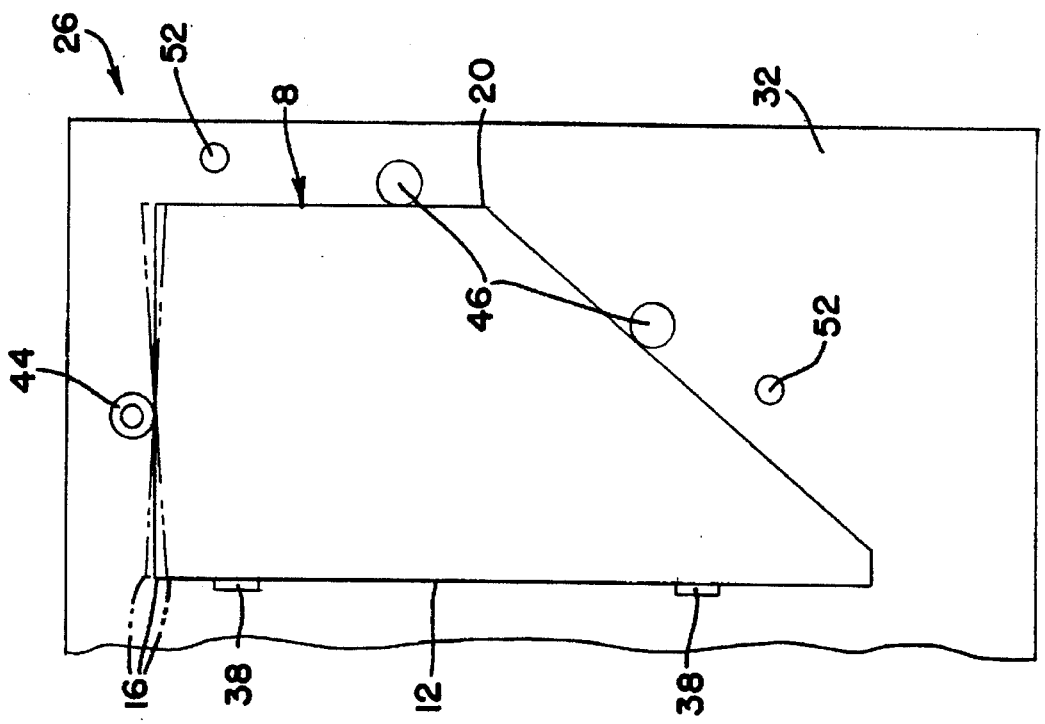
FIG. 6 is a schematic view illustrating how the first blank is pushed into abutment with the locating stops regardless of manufacturing variations in the angle subtended by its reference corner.

Referring next to FIGS. 6 and 7, further details of the positioning of first blank 8, which also apply to the second blank 10, are illustrated. When first blank 8 is dropped into the rough position shown in dotted lines in FIG. 7, the positioning cones 52 assure that the blank 8 is out of its final position by a spatial differential of, at most, X and Y, as measured along the edges of the reference corner 16. The actuator 50 is designed to swing the pusher rollers 46 far enough to close out the X and Y differential. Blank 8 may rock and twist into place, hitting either the stops 38 first, or the roller 44 first, or some combination of the two, but its ultimate destination is assured by the fact that the pushing force is diagonally directed toward the locating corner, as defined above, which will eventually funnel the reference corner 16 into the matching locating corner. The actuator 50 can be designed to turn off when a sufficient resistance is sensed to indicate that the first blank reference corner 16 has been fully seated, or, the actuator 50 can be designed to move the rollers 46 a sufficient distance to close up the X and Y differential, and then turn off automatically with limit switches. In either case, and especially in the latter case, a yielding, elastic mechanism can also be built into the actuator 50, or into the bell cranks 48, to cushion the rollers 46 against the force of the reference corner 16 hitting home, and to compensate yieldingly for any excessive pushing, thereby preventing damage. As shown in FIG. 6, should the angle of the blank reference corner 16 vary above or below the nominal, as illustrated by the dotted lines, the reference corner 16 will still seat properly against both the locating stops 38 and the locating roller 44. The tangential, one point only contact of the outer surface of the locating roller 44 with the first blank reference corner 16 (or, of roller 54 with the second blank reference corner 18) compensates for any corner angle size variations.

Figure 5:
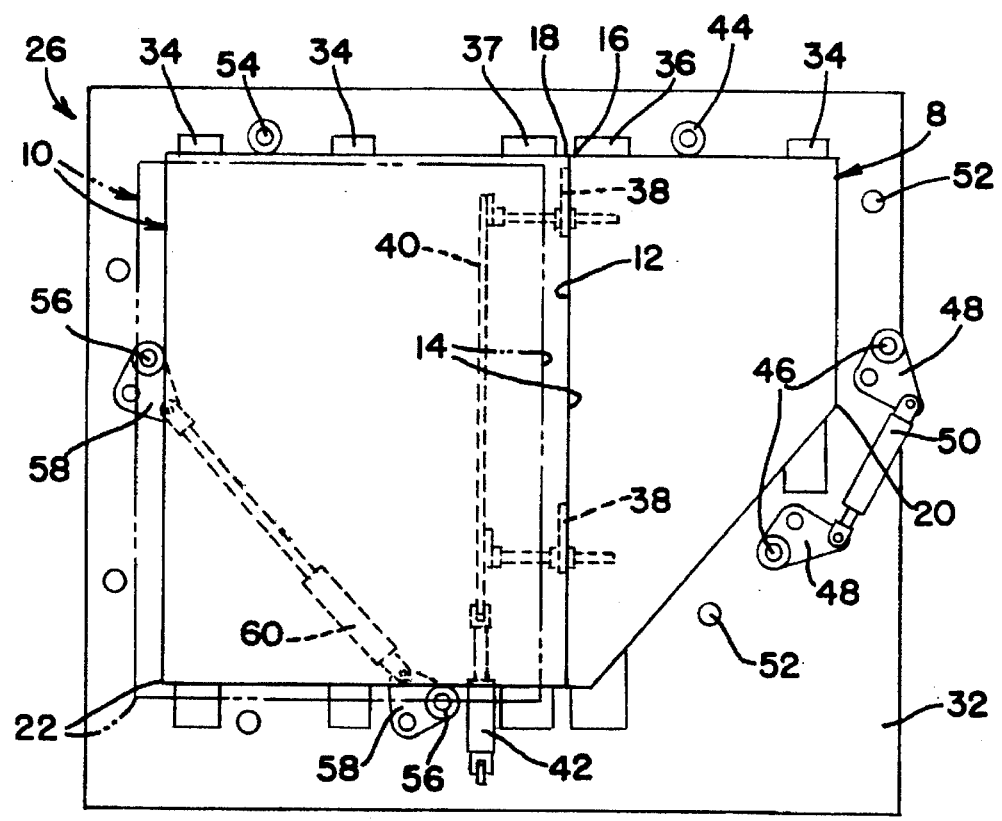
FIG. 5 shows the second blank pushed into position and clamped down.

Referring next to FIGS. 5 and 2, the second blank 10 is located and clamped on fixture 26 almost identically to first blank 8, with one key difference. With the second blank 10, it is not the locating stops 38 which establish the desired and the abutting surface, since they are swung down and out of the way. Instead, it is the already located first blank straight edge 12 that provides the necessary weld line locating ledge, in cooperation with the other cylindrical locating roller 54. This is why it would be an advantage to locate the thicker of the two blanks and clamp it first, leaving the thicker of the two edges to be abutted by the thinner. The pneumatic actuator 60 is extended to swing the bell cranks 58 and engage the rollers 56 to either side of the second blank outer corner 22. The second blank reference corner 18 is pushed from the dotted line to the solid line position, bringing straight edge 14 into abutment with the now solidly clamped (and presumably thicker) first blank straight edge 12. The other edge of the reference corner 18 is pushed into tangent contact with the outer surface of the cylindrical locating roller 54. The other electromagnetic clamp 37 is then energized to hold down straight edge 14, and both straight edges 12 and 14 are now held in solid abutment with each other, on the established weld line. Finally, the loaded fixture 26 is moved straight into the adjacent welding station 28, where the abutted edges 12 and 14 are fused together. While the welding operation is being carried out on the first loaded fixture, the other fixture 26 can be loaded, and vice versa.

The method described could accommodate any sheet metal blanks of roughly polygonal shape, or which had at least one reference corner adjacent to the abutted straight edges. If the reference corners could be sheared with sufficient precision, and did not vary significantly, then the fixture locating corners could be formed by two ledges, rather than one ledge and a cylindrical stop. The cylindrical rollers 44 and 54 work just as well as second straight ledges would in effectively forming a locating corner, however, and accommodate angle tolerance variations, as well. If blanks of a different shape had no "outer corners" per se that were diagonally opposed to the reference corners, there would typically be some roughly diagonally opposed edge to which a force could be applied diagonally toward the locating corner of the fixture. Different components on the fixture 26 could provide the same locating and clamping features. For example, if one blank straight edge were significantly longer than the other, rather than roughly equal in length, as here, then the spaced apart planar locating stops 38 could, conceivably, be fixed and stationary, rather than pivotable. They could abut the longer blank straight edge near the ends thereof, spaced farther apart than the length of the second blank's shorter straight edge. The second blank could then simply be pushed between the fixed stops without interference and into abutment with the first blank's already clamped straight edge. However, the abutted edges will usually be of comparable length, so it will be necessary to have planar stops that can somehow be cleared out of the way before the second blank is positioned. Other mechanisms could be used to force the blanks diagonally into their respective locating corners. Even manual pushing or pulling could be used. As an alternate mechanical mechanism, a swinging electromagnetic arm pivoted to the plate 32 and located entirely beneath the upper surfaces of the cross rails 34 could grab the blank magnetically from beneath and pull it into the locating corner, rather than pushing it. Such a "pulling" device would not need an outer corner or edge to act upon, since it would not protrude above the blanks, and it could also aid in clamping and holding. Since the pusher rollers 46 and 56 do protrude above the plane of the blanks, it is conceivable that the conical, blank funneling upper points of the cones 52 and 62 could be incorporated integrally into them. Of course, the shearing station 23 and shuttle 24 could be set up to drop the blanks close enough to their final position that there would be no need for the positioning cones 52 and 62. Mechanical, snap down clamps could be used to snap down over the top of the blanks once they were seated, instead of the below surface clamps 36 and 37. Something of that nature would have to be used if the blanks were non ferrous, of course. The magnetic clamps 36 and 37 are convenient and compact, however, being entirely out of way of the weld beam.

What is claimed is:

1. A method for fixturing a pair of sheet metal blanks so as to be welded together at comparable length abutted straight edges thereof, with adjacent ends of said straight edges forming blank reference corners, comprising the steps of, providing a generally planar fixture foundation, providing a pair of locating corners on said foundation, each locating corner matching a respective blank reference corner and including a pair of pivotable stops having planar surfaces that define a ledge establishing the desired weld line at which said straight edges are to be abutted, said stops being pivotable from above to below said blanks, placing a first one of said blanks on said foundation near its respective locating corner when said locating stops are pivoted up, applying a force to said first blank sufficient to force it diagonally into its respective locating corner and into abutment with said upwardly pivoted locating stops, clamping said first blank to said fixture foundation in its respective locating corner, pivoting said locating stops down, placing a second one of said blanks near its respective locating corner, applying a force to said second blank sufficient to force it diagonally into its respective locating corner and into abutment with the prior clamped straight edge of said first blank, and, clamping said second blank to said fixture foundation in its respective locating corner, thereby holding said blanks solidly in a proper orientation for welding.

* * * * *